United States Patent
Donie et al.

(10) Patent No.: US 8,954,753 B2
(45) Date of Patent: *Feb. 10, 2015

(54) ENCRYPTING DATA IN VOLATILE MEMORY

(75) Inventors: Benjamin Jay Donie, Chandler, AZ (US); Andreas Mattias Koster, Tucson, AZ (US); Nicole Forsgren Velasquez, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 42 days.

This patent is subject to a terminal disclaimer.

(21) Appl. No.: 13/495,988

(22) Filed: Jun. 13, 2012

(65) Prior Publication Data

US 2012/0272073 A1     Oct. 25, 2012

Related U.S. Application Data

(63) Continuation of application No. 12/508,497, filed on Jul. 23, 2009, now Pat. No. 8,281,154.

(51) Int. Cl.
    *G06F 11/30* (2006.01)
(52) U.S. Cl.
    USPC ............ 713/190; 713/189; 713/193; 380/44; 380/277; 726/34; 726/35
(58) Field of Classification Search
    USPC ........... 713/189, 190, 193; 380/44, 264, 277; 726/34, 35, 36
    See application file for complete search history.

(56) References Cited

U.S. PATENT DOCUMENTS 6,467,075 B1  10/2002  Sato et al.
6,804,781 B1  10/2004  Castro
(Continued)

FOREIGN PATENT DOCUMENTS

EP   1 818 848   8/2007
WO   01 33357    5/2001

OTHER PUBLICATIONS

V. Nagarajan et al., "Compiler-Assisted Memory Encryption for Embedded Processors", pp. 1-15, [retrieved online] http://www.cs.ucr.edu/~gupta/research/Publications/Comp/hipeac07.pdf.

(Continued)

*Primary Examiner* — Baotran N To
(74) *Attorney, Agent, or Firm* — David W. Victor; Konrad Raynes Davda & Victor LLP

(57) ABSTRACT

Provided are a computer program product, system, and method to allocate blocks of memory in a memory device having a plurality of blocks. An unencrypted memory allocation function requests allocation of unencrypted blocks in the memory device. An encrypted memory allocation function requests allocation of encrypted blocks in the memory device. An unencrypted Input/Output (I/O) request performs an I/O operation against the unencrypted blocks in the memory device. An encrypted I/O request function performs an I/O operation against the encrypted blocks in the memory device. An operating system uses an encryption key associated with the encrypted blocks to encrypt or decrypt data in the encrypted blocks to perform the encrypted I/O operation in response to processing the encrypted I/O request functions, wherein the unencrypted and encrypted memory allocation functions and unencrypted and encrypted I/O request functions comprise different functions in a library of functions available to the application.

24 Claims, 5 Drawing Sheets

(56) References Cited

U.S. PATENT DOCUMENTS

| | | | |
|---|---|---|---|
| 7,051,056 | B2 | 5/2006 | Rodriguez-Rivera et al. |
| 7,266,690 | B2 | 9/2007 | Field |
| 7,272,832 | B2 | 9/2007 | Gardner |
| 7,353,403 | B2 | 4/2008 | Kim |
| 7,957,532 | B2 * | 6/2011 | Chen et al. .................... 380/270 |
| 2004/0103288 | A1 | 5/2004 | Ziv et al. |
| 2005/0262341 | A1 * | 11/2005 | Field ............................ 713/165 |
| 2006/0294369 | A1 | 12/2006 | Matsushima et al. |
| 2007/0067644 | A1 | 3/2007 | Flynn et al. |
| 2007/0100916 | A1 | 5/2007 | Konecny et al. |
| 2007/0297610 | A1 | 12/2007 | Chen et al. |
| 2008/0077807 | A1 | 3/2008 | Hicks |
| 2008/0080715 | A1 | 4/2008 | Lee et al. |
| 2008/0162863 | A1 | 7/2008 | McClure et al. |
| 2011/0022853 | A1 | 1/2011 | Donie et al. |

OTHER PUBLICATIONS

R. Lemos, "Hardware Security Sneaks into PC's", CNET News, Mar. 16, 2005, pp. 1-2, [retrieved online Mar. 19, 2009] http://news.cnet.com/Hardware-security-sneaks-into-PCs/2100-7355_3-5619035.html.

J. Evers, "IBM Bakes Security Into Processors", CNET News, Apr. 9, 2006, pp. 1-2, [retrieved online Mar. 19, 2009] http://news.cnet.com/2100-7355_3-6059276.html.

J.Evans, "A Scalable Concurrent malloc (3) Implementation for FreeBSD", Apr. 16, 2006, pp. 1-14.

J.A. Halderman, et al., "Lest We Remember: Cold Boot Attacks on Encryption Keys", Proc. 2008 USENIX Security Symposium, Feb. 21, 2008, pp, 1-16.

R. Naraine, et al., "Cryogenically Frozen RAM Bypasses All Disk Encryption Methods", Zero Day, Feb. 21, 2008, pp. 1-2, [retrieved online Mar. 19, 2009] http://blogs.zdnet.com/security/?p=900.

K. Dawson, "Solution Against Cold Boot Attack in the Making", Jan. 18, 2009, [online]. pp. 1, http://it.slashdot.org/article.pl?sid=09/01/18/2110235.

"Encrypting Data with CNG", Microsoft, [online][Retrieved Jul. 1, 2009], pp. 1-7, http://msdn.microsoft.com/en-us/library/aa376234%28VS.85%29aspx.

First Office Action dated Feb. 2, 2012, pp. 1-16, for U.S. Appl. No. 12/508,97 by inventors B.J. Donie, et al.

Response dated May 2, 2012, pp. 1-14 to First Office Action dated Feb. 2, 2012, pp. 1-16, for U.S. Appl. No. 12/508,97 by inventors B.J. Donie, et al.

Notice of Allowance dated May 25, 2012, pp. 1-8, for U.S. Appl. No. 12/508,97 by inventors B.J. Donie, et al.

PCT Invitation to Pay Additional Fees and, Where Applicable, Protest Fees and Communication Relating to Results of Partial Int'l Search dated Sep. 1, 2010 for Application No. PCT/EP2010/059857 filed Jul 9, 2010.

Scott Oaks, "Java Security", May 2001, IBM Document No. XP002596148, pp. 288-31.

"AIX Version 6.1 Technical Reference", IBM Corporation, First Edition, Nov. 2007, IBM Document No. XP002596149, pp. 620-628, [on line][retrieved Aug. 5, 2010] www.filibeto.org/unix/aix/lib/rel/6.1/basetrf2.pdf.

V. Gough, "EncFS—Encrypted Filesystem Module for Linux", Oct. 2004, IBM Document No. XP002357733, [online][retrieved Jun. 12, 2005] http://web.archive.org/web/20041010174645/arg0.net/users/vgough/encfs.ht.

* cited by examiner

Encrypted Memory Allocation Function

ENCRYPTING DATA IN VOLATILE MEMORY

CROSS-REFERENCE TO RELATED APPLICATION

This application is a continuation of U.S. patent application Ser. No. 12/508,497, filed Jul. 23, 2009, issued as U.S. Pat. No. 8,281,154 on Oct. 2, 2012, which application is incorporated herein by reference in its entirety.

BACKGROUND OF THE INVENTION

1. Field of the Invention

The present invention relates to a computer program product, system, and method for encrypting data in volatile memory.

2. Description of the Related Art

Recently there has been concern that sensitive data buffered in volatile memory, such as Random Access Memory (RAM), can be accessed by an unauthorized user even after the computer shuts down. Previously, computer technologies have relied on the assumption that the content of volatile memory or RAM is lost. However, data may remain in volatile memory even after the computer shuts down or the memory is removed. An unauthorized user may remove a memory chip, such as a RAM, from its host computer, plug into a module in their system, and then access sensitive content and encryption keys to use to access encrypted data elsewhere. Moreover, unauthorized users may actually extend the duration during which data remains intact in volatile memory by spraying compressed air on the memory chip to cryogenically freeze memory, such that the data can remain intact in memory for several minutes.

There is a need in the art for improved techniques for encrypting data in memory to prevent against unauthorized access to sensitive data and encryption keys stored in volatile memory.

SUMMARY

Provided are a computer program product, system, and method to allocate blocks of memory in a memory device having a plurality of blocks. At least one unencrypted memory allocation function coded in an application is executed to request allocation of unencrypted blocks in the memory device. An encrypted memory allocation function coded in the application is executed to request allocation of encrypted blocks in the memory device. At least one unencrypted Input/Output (I/O) request function coded in the application indicating an I/O operation to perform against the unencrypted blocks in the memory device is executed. At least one encrypted I/O request function coded in the application indicating an I/O operation to perform against the encrypted blocks in the memory device is executed. An operating system uses an encryption key associated with the encrypted blocks to encrypt or decrypt data in the encrypted blocks to perform the encrypted I/O operation in response to processing the encrypted I/O request functions, wherein the unencrypted and encrypted memory allocation functions and unencrypted and encrypted I/O request functions comprise different functions in a library of functions available to the application.

DETAILED DESCRIPTION

Figure 1:
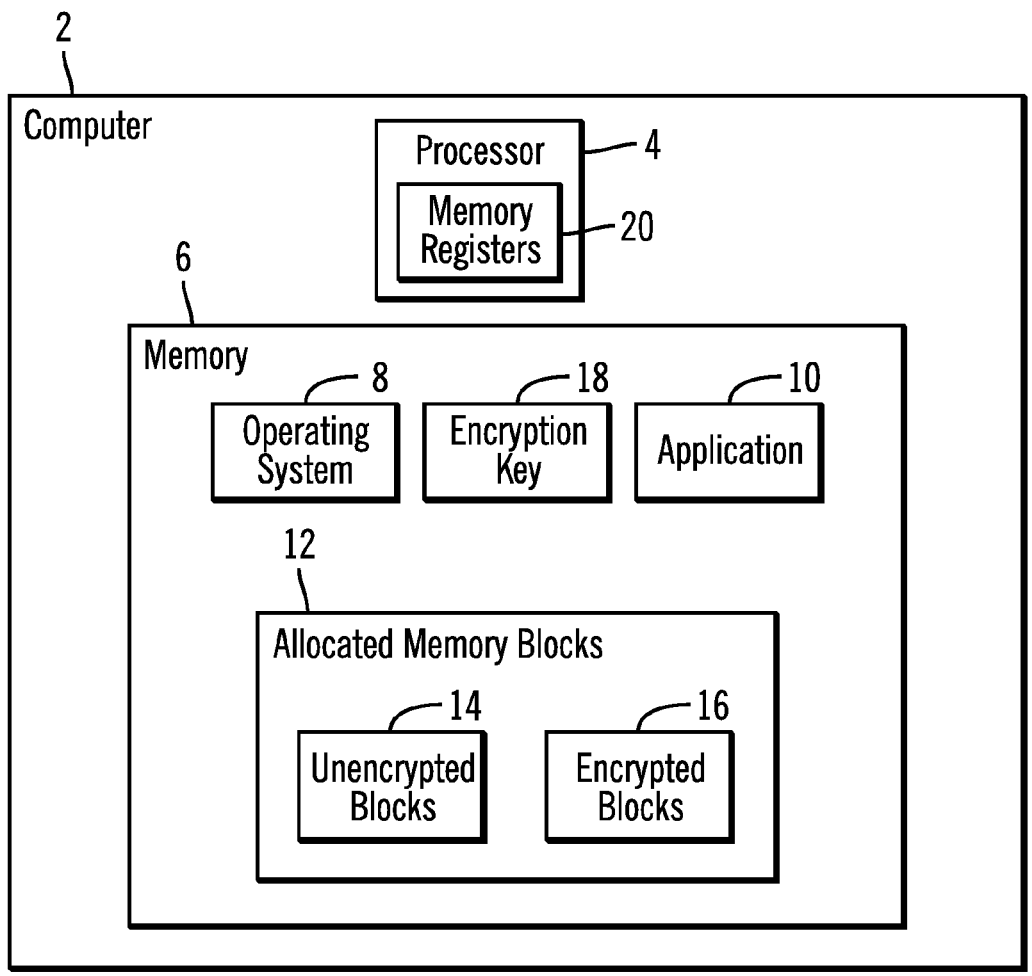
FIG. 1 illustrates an embodiment of a computing environment.

FIG. 1 illustrates an embodiment of a computing environment. A computer 2 includes a processor 4, which may comprise one or more processors, and a memory 6 including programs, such as an operating system 8 and application 10. The memory 6 may comprise one or more volatile memory devices, such as an on-board cache memory and/or a type of Random Access Memory (RAM). The one or more applications 10 submit data requests to the operating system 8. The operating system 8 may allocate memory blocks 12 for use by the application 10. The allocated memory blocks 12 in the memory 6 may include unencrypted blocks 14 and encrypted blocks 16. The encrypted blocks 16 may be encrypted using an encryption key 18. The encryption key 18 may be stored in the memory 6 or maintained in memory registers 20 in the processor 4, such as an on-board L2 cache, Static Random Access Memory (SRAM) or other memory device. In certain embodiments, if the encryption key 18 is stored in the processor registers 20, a copy of the encryption key 18 may be cached temporarily in the memory device 6 to use during I/O operations.

The computer 2 may comprise a computational device known in the art, such as a workstation, mainframe, server, laptop, telephony device, etc. The memory 6 may comprise a random access memory device, such as an SRAM, DRAM, EEPROM, etc., and be volatile or non-volatile. The operating system 8 may comprise suitable operating systems known in the art, such as the International Business Machines ("IBM®") z/OS® operating system. (IBM and z/OS are trademarks of IBM in the United States and foreign countries). The application 10 may comprise any type of application executing in the computer 2 that maintains encrypted and unencrypted blocks.

The operating system 8 may provide a library of functions for memory allocation operations for use by applications 10 to request allocation of memory blocks 12. The memory blocks 12 comprise groups of one or more bits in the memory 6. One such function may be a dynamic memory allocation function known in the art, such as the "malloc" subroutine that applications call to request an allocation of unencrypted memory blocks 14, or an unencrypted memory allocation function. In described embodiments, the library of functions further includes an encrypted memory allocation function that allocates encrypted blocks 16 to be used to store data encrypted in the encrypted blocks 16. In this way, an application 10 may request allocation of specific blocks 16 in memory in which data will be stored encrypted. For instance, the application 10 may store sensitive data, such as personal information, financial information, in the encrypted blocks 16 using the secure memory allocation function.

The unencrypted blocks 14 and encrypted blocks 16 may include contiguous and non-contiguous blocks of addresses in the memory 6. The application 10 developer codes the application 10 with the encrypted and/or unencrypted memory allocation functions depending on whether the memory blocks being requested are for sensitive data to be encrypted and protected in memory or data that does not need to be encrypted in memory. In this way, sensitive data included in the encrypted blocks 16 are not accessible if someone hacks into the memory 6 as described above. Different encryption keys 18 may be maintained for different applications and/or for different encrypted blocks allocated to the same application. Alternatively, one encryption key 18 may be used for encrypted blocks 14 allocated to multiple applications 10.

Figure 2:
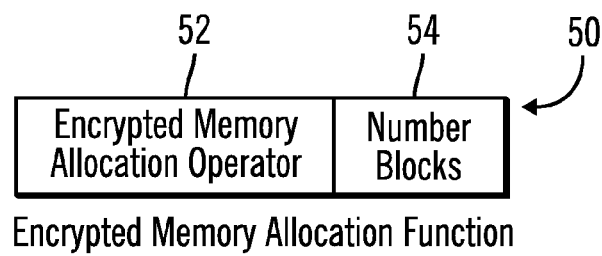
FIG. 2 illustrates an embodiment of an encrypted memory allocation function.

FIG. 2 illustrates an embodiment of an encrypted memory allocation function 50, including an encrypted memory allocation operator 52 specifying a request or allocation of blocks in memory to be encrypted and a number of blocks 54 to allocate.

Figure 3:
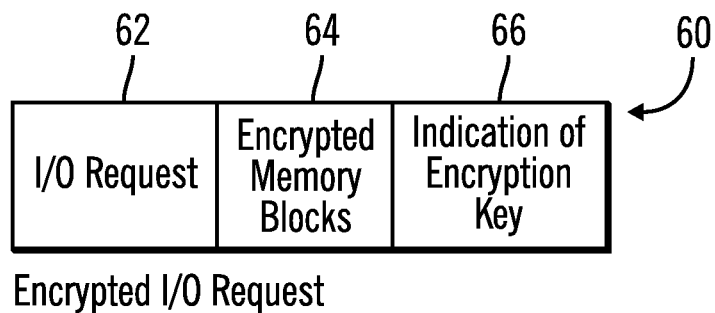
FIG. 3 illustrates an embodiment of an encrypted Input/Output (I/O) request.

FIG. 3 illustrates an embodiment of an encrypted I/O request 60 as including an I/O operator 62, such as a read or write operator, the encrypted memory blocks 64 to which the I/O operator applies, and an indication of the encryption key 66, which may comprise the actual encryption key or an identifier or pointer to the encryption key 18 in memory 6 or processor registers 20.

Figure 4:
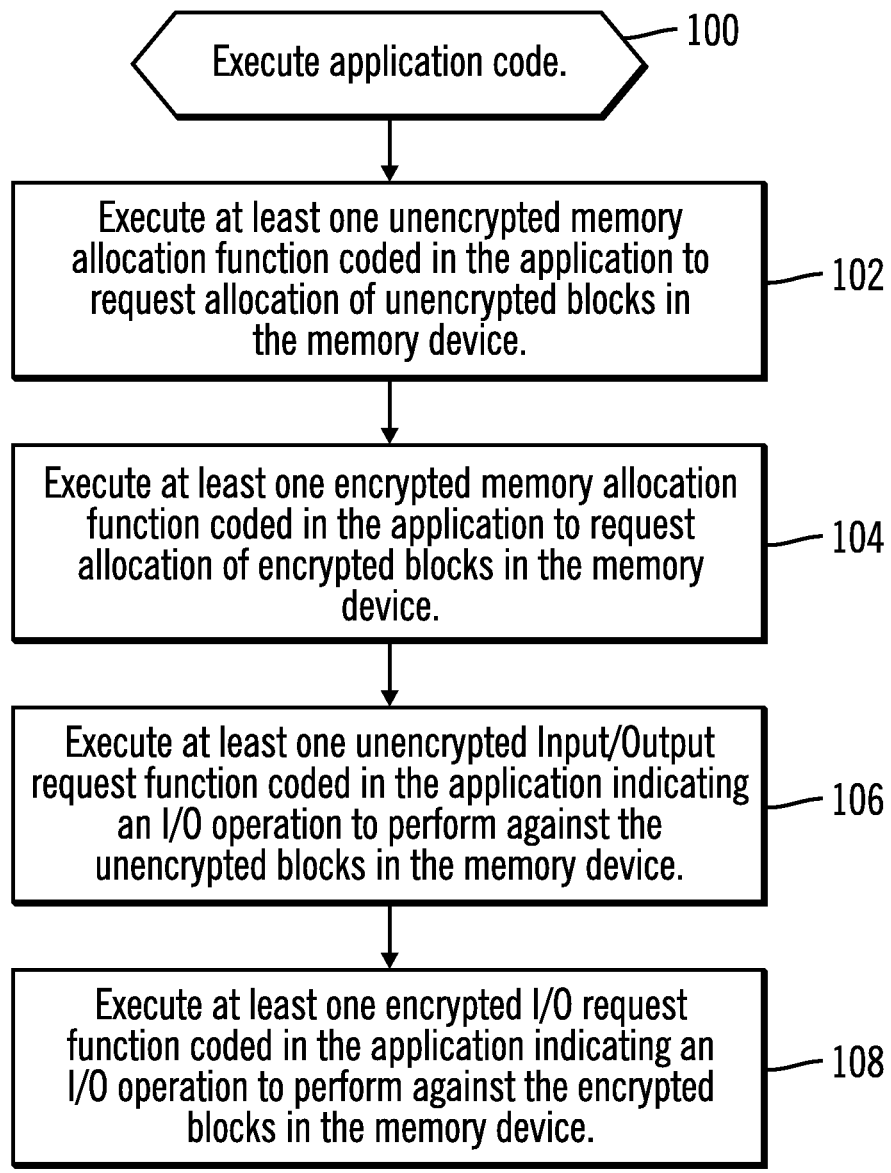
FIG. 4 illustrates an embodiment of operations to execute application code having encrypted and unencrypted memory allocation functions and I/O requests.

FIG. 4 illustrates an embodiment of operations performed by the application 10 executed by the processor 4. At block 100, execution of the application 10 begins. The application 10 executes (at block 102) one or more unencrypted memory allocation functions coded in the application 10 when the application 10 needs unencrypted blocks 14 in memory 6, such as the prior art "malloc" function. The application 10 executes (at block 104) at least one encrypted memory allocation function 50, indicating the number of encrypted blocks 54 to allocate, coded in the application 10 when the application 10 needs encrypted blocks 16 in memory 6 to store sensitive data. After receiving allocated unencrypted 14 memory blocks, the application 10 executes (at block 106) an unencrypted Input/Output (I/O) request function coded in the application to perform an unencrypted I/O operation against the unencrypted blocks 14 in the memory 6. After receiving allocated encrypted 16 memory blocks, the application 10 executes (at block 108) the encrypted I/O request function 60 (FIG. 3) coded in the application 10 to perform encrypted I/O operations against the encrypted blocks 16 in the memory 6. The application 10 may include multiple instances of the unencrypted memory allocation function and encrypted memory allocation function 50 followed by one or more unencrypted I/O requests to perform read and write operations with respect to the unencrypted blocks 14 and encrypted I/O requests 60 to perform read and write operations with respect to the encrypted blocks 16. In certain embodiments, the application 10 may include only encrypted memory allocation 50 and I/O request 60 functions, and not unencrypted allocation and I/O request functions.

Figure 5:
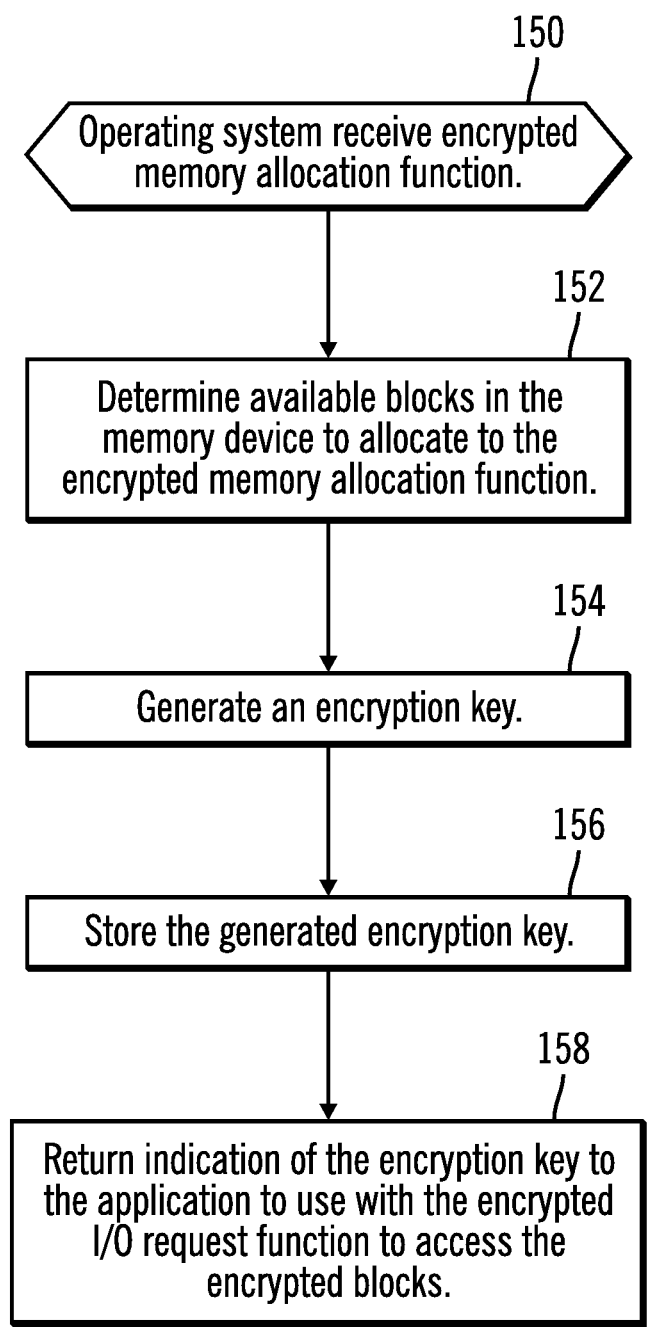
FIG. 5 illustrates an embodiment of operations to process an encrypted memory allocation function.

FIG. 5 illustrates an embodiment of operations performed by the operating system 8, executed by the processor 4, to process an encrypted memory allocation function 50 called by the application 10. In response (at block 150) to receiving the encrypted memory allocation function 50, the operating system 8 determines (at block 152) available memory blocks to allocate to the allocation request for the requested number of blocks 54, which may be at contiguous or non-contiguous physical locations in the memory 6. The operating system 8 generates (at block 154) an encryption key 18 to use for the allocated encrypted memory blocks 16. The generated encryption key 18 is stored (at block 156). In one embodiment, the generated encryption key may be stored in memory registers 20 of the processor 4. In an additional embodiment, the encryption key 18 may be stored in locations in the memory 6, such as at non-contiguous locations. The operating system 8 returns (at block 156) indication of the encryption key to the application to use with encrypted I/O request functions to perform the requested I/O operations with respect to the encrypted blocks 16. In one embodiment, the operating system 8 may return the actual encryption key 18 to the application 10 invoking the encrypted memory allocation function 50 (FIG. 2) or, alternatively, return a pointer or address of the encryption key 18 stored in the memory registers 20 of the processor 4 or the memory 6.

Figure 6:
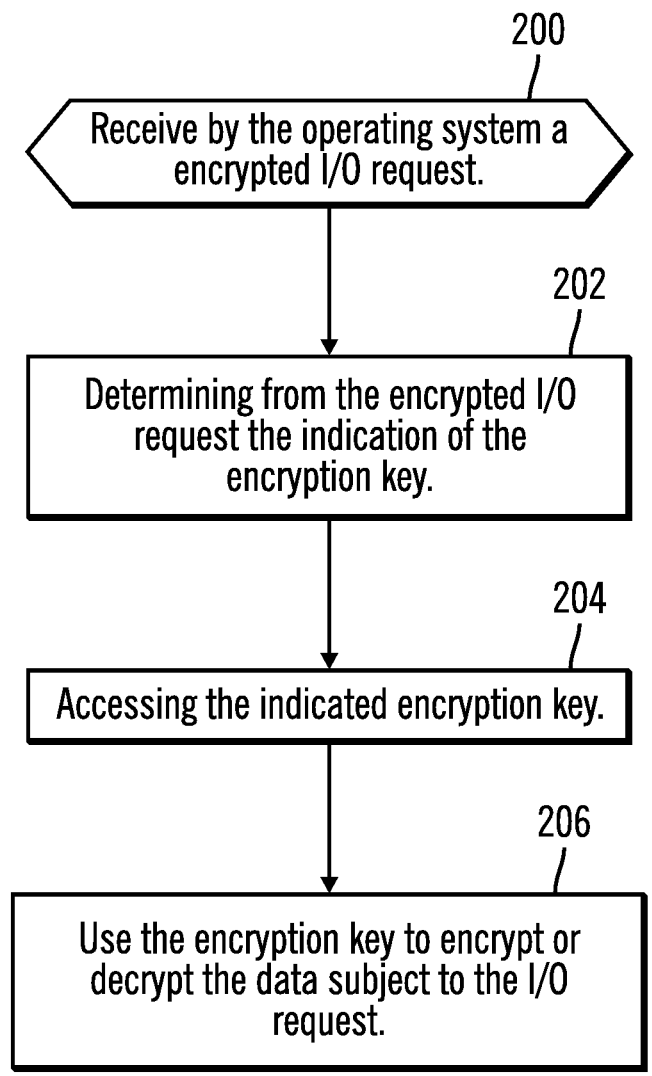
FIGS. 6 and 7 illustrate embodiments of operations to process an encrypted I/O request.

FIG. 6 illustrates an embodiment of operations performed by the operating system 8 to process an encrypted I/O request 60 from the application 10. Upon receiving (at block 200) the encrypted I/O request 60, the operating system 8 determines (at block 202) from the encrypted I/O 60 request the indication of the encryption key 66 (FIG. 3). As discussed, the actual encryption key 18 may be sent to the application 10 to use or an address of the encryption key in the memory registers 20 or memory 6. The operating system 8 then accesses the indicated encryption key 64, which may be attached to the I/O request or accessed from a location, e.g., registers 20 or memory 6, using the address or pointer of the encryption key 18 indicated in the indication field 66 in the encrypted I/O request 60 (FIG. 3). The operating system 8 then uses (at block 206) the accessed encryption key 18 to encrypt or decrypt the data subject to perform the requested encrypted I/O operation. If the encrypted I/O operator 62 comprises a write, then the operating system 8 uses the encryption key 18 to encrypt the write data to write to the encrypted blocks 16. If the encrypted I/O operator 62 comprises a read, then the operating system 8 uses the encryption key 18 to decrypt the data in the encrypted blocks 16 to return to the I/O request.

Figure 7:
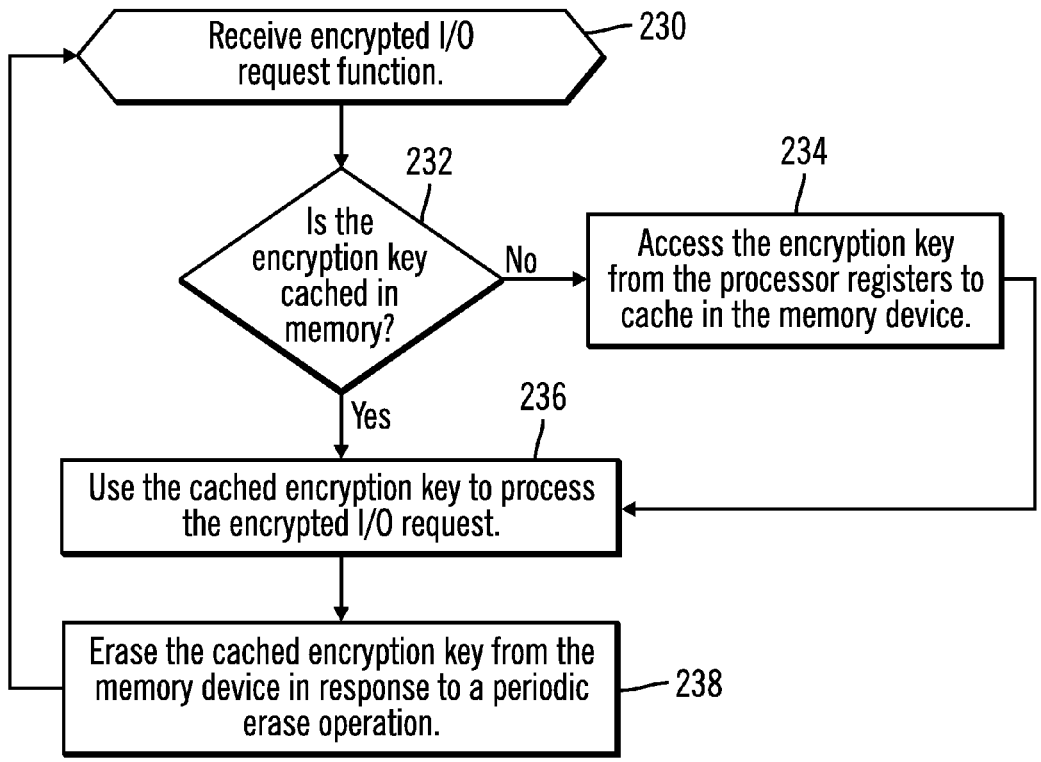

FIG. 7 illustrates an embodiment of operations performed by the operating system 8 when the encryption key 18 is maintained in processor memory registers 20, but cached in the memory 6 for processing encrypted I/O requests. Upon receiving (at block 230) an encrypted I/O request function 60, if (at block 232) the encryption key 18, indicated in field 66 (FIG. 3), is not cached in the memory device 6, then the operating system 8 accesses (at block 234) the indicated encryption key 18 from the processor registers 20 to cache in the memory device 6 to use. If (at block 232) the indicated encryption key 18 is currently cached in the memory 6 or after the encryption key 18 is cached (from block 234), then the operating system 8 uses (at block 236) the cached encryption key 18 to process the encrypted I/O request 60. Periodically, the operating system 8 may erase (at block 238) the encryption key 18 from the memory 6 to limit the risk the encryption key 18 is in memory 6 and accessible to an unauthorized user who accesses the memory 6 to access sensitive data. Control then proceeds back to block 230 to wait for the next encrypted I/O request 60.

Figure 8:
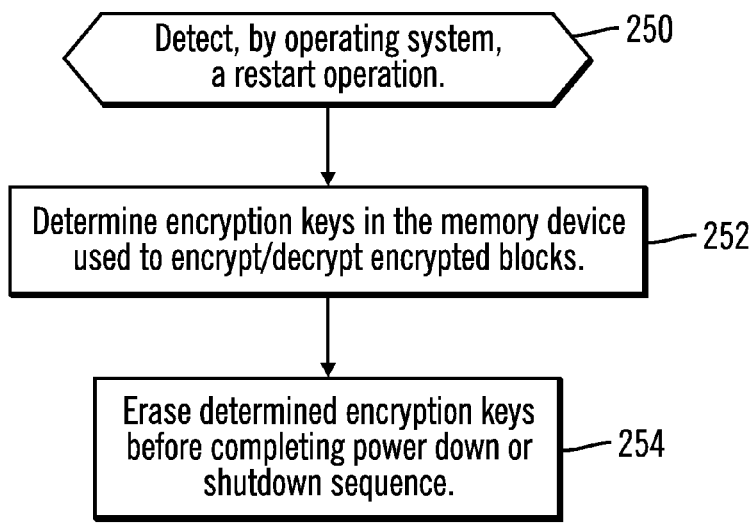
FIG. 8 illustrates an embodiment of operations to erase an encryption keys in memory.

FIG. 8 illustrates an embodiment of operations performed by the operating system 8 to erase encryption keys 18 in the memory 6 as part of a cold or warm restart procedure. Upon detecting (at block 250) a restart operation, such as a cold or warm restart, the operating system 8 determines (at block 252) encryption keys 18 in the memory device 8 used to encrypt/decrypt encrypted blocks 14. The determined encryption keys 18 are erased (at block 254) before completing the power down, restart or shut down sequence. This prevents an unauthorized user from accessing the encryption keys 18 to access unencrypted blocks 18 following a restart of the system.

Described embodiments provide techniques to encrypt specific allocated blocks in memory 6 using an encryption key 18. This helps prevent hackers from accessing sensitive data in the encrypted blocks.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

The use of variable references, such as "n" or "m", etc., to denote a number of instances of an item may refer to any integer number of instances of the item, where different variables may comprise the same number or different numbers. Further, a same variable reference used with different elements may denote a same or different number of instances of those elements.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 4-8 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer program product to allocate blocks of memory in a memory device having a plurality of blocks, the computer program product comprising a computer readable storage device having computer readable program code including an application and an operating system embodied therein that executes to communicate with processor registers and the memory device and perform operations, the operations comprising:

executing at least one unencrypted memory allocation function coded in the application to request allocation of unencrypted blocks in the memory device;

executing an encrypted memory allocation function coded in the application to request allocation of encrypted blocks in the memory device;

executing the operating system to generate an encryption key to encrypt the encrypted blocks allocated for the memory allocation function;

storing the generated encryption key, wherein blocks allocated to the application include encrypted and unencrypted blocks;

executing at least one unencrypted Input/Output (I/O) request function coded in the application indicating an unencrypted I/O operation to perform against the unencrypted blocks in the memory device;

executing at least one encrypted I/O request function coded in the application indicating an encrypted I/O operation to perform against the encrypted blocks in the memory device; and executing the operating system to use the stored encryption key generated to encrypt the encrypted blocks allocated in response to the encrypted memory allocation function to encrypt or decrypt data in the encrypted blocks to perform the encrypted I/O operation in response to processing the at least one encrypted I/O request function, wherein the unencrypted and encrypted memory allocation functions and unencrypted and encrypted I/O request functions comprise different functions in a library of functions available to the application.

2. The computer program product of claim 1, wherein the operations further comprise executing the operating system to perform:

generating the encryption key in response to processing the encrypted memory allocation function; and returning indication of the encryption key to the application to use with the at least one encrypted I/O request function to access the encrypted blocks.

3. The computer program product of claim 2, wherein the encrypted I/O request function indicates the encryption key for the operating system to use to encrypt or decrypt the data that is subject to the executed encrypted I/O request function.

4. The computer program product of claim 3, wherein the operations further comprise:

executing the application to access the encryption key, wherein indicating the encryption key in the encrypted I/O request function comprises including the encryption key in the encrypted I/O request function sent to the operating system.

5. The computer program product of claim 3, wherein indicating the encryption key in the encrypted I/O request function comprises including a pointer to the encryption key in the encrypted I/O request function to the operating system.

6. The computer program product of claim 1, wherein the encryption key is stored in blocks in the memory device accessible to the operating system to use to decrypt and encrypt the data to perform the encrypted I/O request.

7. The computer program product of claim 6, wherein the operations further comprise executing the operating system to further perform:

erasing the encryption key in the memory device in response to execution of a shut down operation.

8. The computer program product of claim 1, wherein the operations further comprise executing the operating system to further perform:

generating the encryption key in response to processing the encrypted memory allocation function;

storing the encryption key; and accessing the encryption key in response to processing the encrypted I/O request function to use to perform the I/O operation indicated in the I/O request function.

9. A system, comprising:

a processor;

a memory device including an application and an operating system executed by the processor to perform operations, the operations comprising:

executing at least one unencrypted memory allocation function coded in the application to request allocation of unencrypted blocks in the memory device;

executing an encrypted memory allocation function coded in the application to request allocation of encrypted blocks in the memory device;

executing the operating system to generate an encryption key to encrypt the encrypted blocks allocated for the memory allocation function;

storing the generated encryption key, wherein blocks allocated to the application include encrypted and unencrypted blocks;

executing at least one unencrypted Input/Output (I/O) request function coded in the application indicating an unencrypted I/O operation to perform against the unencrypted blocks in the memory device;

executing at least one encrypted I/O request function coded in the application indicating an encrypted I/O operation to perform against the encrypted blocks in the memory device; and executing the operating system to use the stored encryption key generated to encrypt the encrypted blocks allocated in response to the encrypted memory allocation function to encrypt or decrypt data in the encrypted blocks to perform the encrypted I/O operation in response to processing the at least one encrypted I/O request function, wherein the unencrypted and encrypted memory allocation functions and unencrypted and encrypted I/O request functions comprise different functions in a library of functions available to the application.

10. The system of claim 9, wherein the operations further comprise executing the operating system to perform:
generating the encryption key in response to processing the encrypted memory allocation function; and
returning indication of the encryption key to the application to use with the at least one encrypted I/O request function to access the encrypted blocks.

11. The system of claim 10, wherein the encrypted I/O request function indicates the encryption key for the operating system to use to encrypt or decrypt the data that is subject to the executed encrypted I/O request function.

12. The system of claim 9, wherein the encryption key is stored in blocks in the memory device accessible to the operating system to use to decrypt and encrypt the data to perform the encrypted I/O request.

13. The system of claim 12, wherein the operations further comprise executing the operating system to perform:
erasing, by the operating system, the encryption key in the memory device in response to execution of a shut down operation.

14. The system of claim 9, wherein the operations further comprise executing the operating system to perform:
generating the encryption key in response to processing the encrypted memory allocation function;
storing the encryption key; and
accessing the encryption key in response to processing the encrypted I/O request function to use to perform the I/O operation indicated in the I/O request function.

15. A computer implemented method executed in a computer system to allocate blocks of memory in a memory device having a plurality of blocks, comprising:
executing at least one unencrypted memory allocation function coded in an application to request allocation of unencrypted blocks in the memory device;
executing an encrypted memory allocation function coded in the application to request allocation of encrypted blocks in the memory device;

executing an operating system to generate an encryption key to encrypt the encrypted blocks allocated for the memory allocation function;

storing the generated encryption key, wherein blocks allocated to the application include encrypted and unencrypted blocks;

executing at least one unencrypted Input/Output (I/O) request function coded in the application indicating an unencrypted an I/O operation to perform against the unencrypted blocks in the memory device;

executing at least one encrypted I/O request function coded in the application indicating an encrypted I/O operation to perform against the encrypted blocks in the memory device; and using, by the operating system, the stored encryption key generated to encrypt the encrypted blocks allocated in response to the encrypted memory allocation function to encrypt or decrypt data in the encrypted blocks to perform the encrypted I/O operation in response to processing the at least one encrypted I/O request function, wherein the unencrypted and encrypted memory allocation functions and unencrypted and encrypted I/O request functions comprise different functions in a library of functions available to the application.

16. The method of claim 15, further comprising:
generating, by the operating system, the encryption key in response to processing the encrypted memory allocation function; and
returning indication of the encryption key to the application to use with the at least one encrypted I/O request function to access the encrypted blocks.

17. The method of claim 16, wherein the encrypted I/O request function indicates the encryption key for the operating system to use to encrypt or decrypt the data that is subject to the executed encrypted I/O request function.

18. The method of claim 15, wherein the encryption key is stored in blocks in the memory device accessible to the operating system to use to decrypt and encrypt the data to perform the encrypted I/O request.

19. The method of claim 18, further comprising:
erasing, by the operating system, the encryption key in the memory device in response to execution of a shut down operation.

20. The system of claim 11, wherein the operations further comprise:
executing the application to access the encryption key, wherein indicating the encryption key in the encrypted I/O request function comprises including the encryption key in the encrypted I/O request function sent to the operating system.

21. The system of claim 11, wherein indicating the encryption key in the encrypted I/O request function comprises including a pointer to the encryption key in the encrypted I/O request function to the operating system.

22. The method of claim 21, further comprising:
executing the application to access the encryption key, wherein indicating the encryption key in the encrypted I/O request function comprises including the encryption key in the encrypted I/O request function sent to the operating system.

23. The method of claim 17, wherein indicating the encryption key in the encrypted I/O request function comprises including a pointer to the encryption key in the encrypted I/O request function to the operating system.

24. The method of claim 15, wherein the operating system is executed to further perform:

generating the encryption key in response to processing the encrypted memory allocation function;
storing the encryption key;
accessing the encryption key in response to processing the encrypted I/O request function to use to perform the I/O operation indicated in the I/O request function.

\* \* \* \* \*